United States Patent [19]

Panzica et al.

[11] 4,174,852
[45] Nov. 20, 1979

[54] FOOT REST ASSEMBLY FOR MOTORCYCLE

[76] Inventors: Nace J. Panzica, 3033 Vistamont, San Jose, Calif. 95118; Tyrone A. Cruze, 6761 San Anselmo, San Jose, Calif. 95119

[21] Appl. No.: 919,844

[22] Filed: Jun. 28, 1978

[51] Int. Cl.² ............................................. B62J 25/00
[52] U.S. Cl. ..................................... 280/291; 74/564; 280/289 R
[58] Field of Search ........... 280/289 R, 289 G, 289 E, 280/291, 163, 164 R; 74/564; 297/433, 436; D12/114

[56] References Cited

U.S. PATENT DOCUMENTS

| | | | |
|---|---|---|---|
| 3,773,355 | 11/1973 | Swartz | 280/291 |
| 3,784,247 | 1/1974 | Mills | 297/433 |
| 3,967,834 | 7/1976 | LaCharite | 280/291 |

FOREIGN PATENT DOCUMENTS 629062  9/1949  United Kingdom ..................... 280/291

Primary Examiner—Joseph F. Peters, Jr.
Assistant Examiner—Donn McGiehan
Attorney, Agent, or Firm—Flehr, Hohbach, Test, Albritton & Herbert

[57] ABSTRACT

A foot rest assembly for attachment to a peg bracket of a motorcycle is characterized by an extension rod coupled to the bracket and a "floor board" style foot rest pivotably coupled to the extension rod in a manner to be movable between lowered and raised positions so as to be able to be folded alongside the motorcycle.

5 Claims, 7 Drawing Figures

U.S. Patent      Nov. 20, 1979      4,174,852
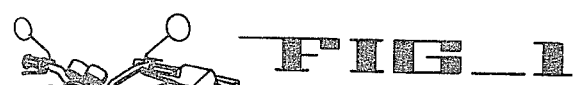
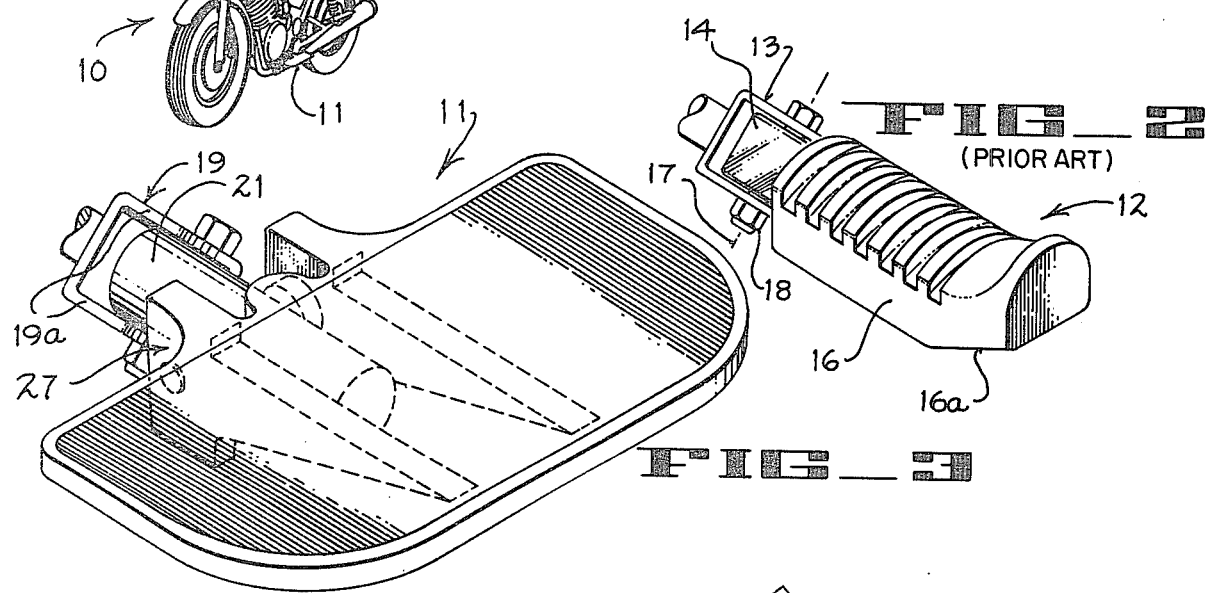
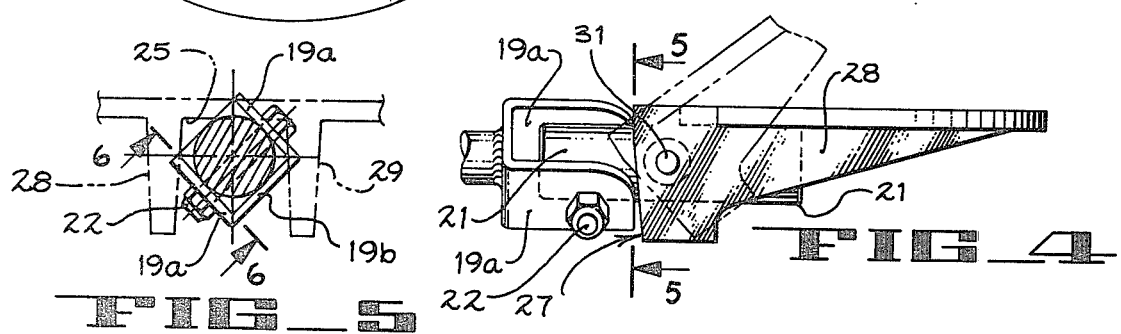
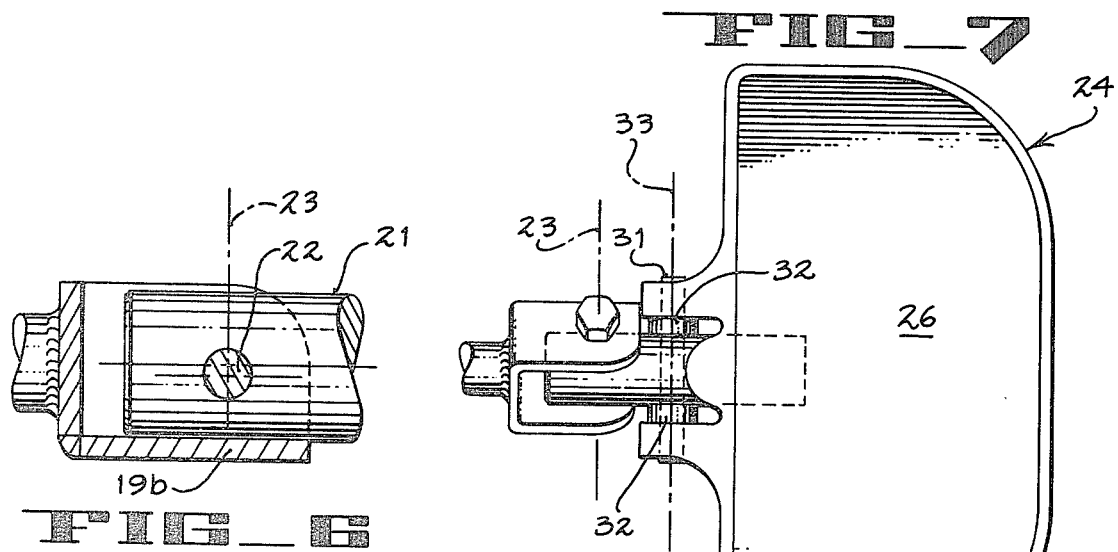

FOOT REST ASSEMBLY FOR MOTORCYCLE

BACKGROUND OF THE INVENTION

This invention pertains to an improved foot rest assembly of a type for easily mounting "floor boards" to a motorcycle wherein the "floor board" provides a relatively broad, elongate member disposed alongside the motorcycle together with means permitting the "floor board" to be folded upwardly toward the motorcycle to prevent damage thereto.

Heretofore means for mounting "floor boards" on motorcycles have typically involved elaborate supporting structure carried beneath and across the motorcycle so that the supporting structure itself becomes a significant investment, addition of weight and bulk, and provides problems attendant thereto.

SUMMARY OF THE INVENTION AND OBJECTS

In general, as provided herein a foot rest assembly couples to a bracket carried by the motorcycle. A rigid extension rod disposed between the sidewalls of the bracket extends beyond the end of the bracket. The extended end of the rod supports a foot rest member having a relatively broad, elongate foot rest surface coupled to the rod as the rod underlies the foot rest member. Preferably the foot rest member is coupled in a manner to permit the foot rest member to be pivoted between lowered and raised positions.

In general, it is an object of the present invention to provide an improved foot rest arrangement for a motorcycle.

It is another object of the invention to provide an improved means for supporting a foot rest assembly to be carried by a motorcycle.

The foregoing and other objects of the invention will become more readily evident from the following detailed description of a preferred embodiment when considered in conjunction with the drawings.

BRIEF DESCRIPTION OF THE DRAWINGS

FIG. 1 shows a perspective view of a motorcycle with a foot rest assembly, according to the invention;

FIG. 2 shows a diagrammatic perspective view of a prior art foot "peg" oriented to be mounted on the rider's right hand side of a motorcycle;

FIG. 3 shows a diagrammatic perspective view of a foot rest assembly, according to the invention;

FIG. 4 shows an end elevation view of a foot rest assembly taken along line 4—4 of FIG. 7, according to the invention;

FIG. 5 shows a transverse section view taken along the line 5—5 of FIG. 4;

FIG. 6 shows a section view taken along the line 6—6 of FIG. 5; and

FIG. 7 shows a plan view of a foot rest assembly, according to the invention.

DETAILED DESCRIPTION OF PREFERRED EMBODIMENT

As shown in FIG. 1 a motorcycle 10 has been equipped with a foot rest assembly 11 on each side of the motorcycle 10. Foot rests of the kind having a broad elongate surface are popularly known as "floor boards" and have been employed to make riding the motorcycle more comfortable as compared to use of "foot pegs" of a type as shown, for example, in FIG. 2.

The "foot peg" 12 comprises a bracket 13 having a pair of spaced sidewalls for receiving the rectangularly shaped rigid body 14. Body 14 is covered by a suitable elastomeric covering or tread 16. The underside of covering 16 tapers upwardly and outwardly along surface 16a so as not to engage the ground when the motorcycle to which it is attached lays over at an angle. The orientation of assembly 12 is arranged as though it were attached to the rider's right hand side of a motorcycle as it moves in a direction diagonally from lower left to upper right across the sheet of drawings.

It should be readily evident that should the outer end of foot peg 12 engage the ground as the motorcycle is tipped, the driver of the motorcycle could lose control or the foot peg itself become damaged. Accordingly, foot peg 12 is arranged to pivot upwardly about the axis 17 of a pivot pin 18 toward a trailing position. In order to accomplish this the underside of body 14 must be formed or mounted in a manner to be free to move. Bracket 13 can be formed with a back wall.

Assembly 11 is mounted from a "peg" bracket 19 attached to a motorcycle. Bracket 19 includes a pair of spaced side walls 19a and a back wall 19b extending along and between side walls 19a. An extension rod 21 is disposed between side walls 19a. A retaining pin 22 in rod 21 extends between side walls 19a for maintaining rod 21 within bracket 19.

As shown best in FIG. 6, the attached end of rod 21 lies in contact with and along back wall 19b on both sides of a vertical plane 23 taken through pin 22 so as to prevent pivoting movement of rod 21 about pin 22.

Rod 21 extends sufficiently beyond the end of bracket 19 so as to be able to underlie and provide support to a foot rest member 24. Member 24 includes a top portion having a relatively broad elongate foot rest surface 26 and includes a bottom portion characterized by a bracket 27 formed by a pair of generally triangularly shaped cantilever supports 28, 29 formed or cast integral with the upper portion of foot rest member 24. Thus, the underside 25 of the top portion extends along and between the sides 28, 29 of bracket portion 27.

The spacing between supports 28, 29 is sufficient to receive the outer end of rod 21 therebetween in supporting relation beneath portion 26.

Means coupling member 24 to rod 21 in supporting relation therebetween comprises the pivot pin 31 extending through bracket 27 and passing through rod 21. As shown in FIG. 7 spacers 32 are interposed between cantilever portions 28, 29 and rod 21.

Accordingly, the means for coupling member 24 in supporting relation with regard to the distal end of rod 21 provides a pivot connection to permit member 24 to move between lowered and raised positions. Preferably pivot pin 31 lies on a substantially horizontal axis to permit member 24 to be folded substantially vertically upwardly alongside a motorcycle carrying assembly 11. As thus arranged retaining pin 22 and pivot pin 31 lie in spaced planes 23, 33 disposed along rod 21.

From the foregoing it will be readily evident that there has been provided an improved foot rest member of a type popularly referred to as a "floor board" for attachment to the "peg" brackets of a motorcycle without the need to employ the elaborate supporting understructure presently used for installing "floor boards" on motorcycles.

We claim:

1. A foot rest assembly for a motorcycle comprising a bracket adapted to be mounted to a motorcycle, said bracket having a pair of spaced side walls and a back wall extending along and between said side walls, an extension rod disposed between said side walls, means coupling said rod to said bracket, a foot rest member having a relatively broad elongate foot rest surface, and means coupling said member to said rod at a position beyond said bracket in a manner to support said foot rest member upon said rod.

2. A foot rest assembly according to claim 1 in which the last named means forms a pivot connection between said rod and said member to permit said member to pivot between lowered and raised positions.

3. A foot rest assembly according to claim 2 in which said pivot lies on a substantially horizontal axis to permit said member to be folded substantially vertically upwardly alongside a motorcycle carrying same.

4. For a motorcycle, a foot rest assembly to be carried by a bracket secured to the motorcycle, said bracket being of a type having spaced side walls adapted to carry a mounting pin extending therebetween, said foot rest assembly comprising an elongate rigid extension rod dimensioned and adapted to be disposed to extend along and between the side walls of the bracket, said extension rod being formed to include an opening extending transversely therethrough for receiving the mounting pin to maintain said rod within the bracket, a foot rest member having a top portion including a relatively broad elongate foot rest surface, said member having a bottom portion including a bracket portion formed to receive said extension rod between spaced side walls thereof, the underside of said top portion extending along and between the sides of said bracket portion, and means supporting said member to pivot about an axis disposed transversely of said extension rod and spaced from said mounting pin to permit said foot rest member to move between lowered and raised positions.

5. A foot rest assembly for a motorcycle comprising a first bracket adapted to be mounted to a motorcycle, said bracket having a pair of spaced side walls and a back wall extending along and between said side walls, an extension rod disposed between said side walls, a retaining pin in said rod and extending between said side walls for maintaining said rod in said first bracket, said rod being disposed in contact with portions of said back wall lying on opposite sides of a vertical plane taken through said pin to preclude movement of said rod about said pin, a foot rest member having a top portion including a relatively broad elongate foot rest surface and a bottom portion including a second bracket formed to receive said rod, said rod extending sufficiently beyond the end of said first bracket to underlie and support said foot rest member and means for coupling said second bracket to said rod to permit said member to be pivotally moved between lowered and raised positions.

* * * * *